(12) United States Patent
Mune et al.

(10) Patent No.: US 7,085,469 B2
(45) Date of Patent: Aug. 1, 2006

(54) PROCESS FOR PRODUCING THREE-DIMENSIONAL POLYIMIDE OPTICAL WAVEGUIDE

(75) Inventors: Kazunori Mune, Osaka (JP); Ryuusuke Naitou, Osaka (JP); Amane Mochizuki, Osaka (JP); Atsushi Hino, Osaka (JP); Mika Horiike, Osaka (JP)

(73) Assignee: Nitto Denko Corporation, Osaka (JP)

( * ) Notice: Subject to any disclaimer, the term of this patent is extended or adjusted under 35 U.S.C. 154(b) by 40 days.

(21) Appl. No.: 10/700,635

(22) Filed: Nov. 5, 2003

(65) Prior Publication Data
US 2004/0131324 A1    Jul. 8, 2004

(30) Foreign Application Priority Data
Nov. 25, 2002  (JP) .................. P. 2002-341565

(51) Int. Cl.
G02B 6/00 (2006.01)
G02B 6/10 (2006.01)
G03C 5/00 (2006.01)
C03B 37/022 (2006.01)
C03B 37/023 (2006.01)

(52) U.S. Cl. ............ 385/143; 385/141; 385/142; 385/144; 385/145; 385/129; 385/130; 385/132; 430/269; 430/330; 65/385; 65/386

(58) Field of Classification Search ........ 385/129–132, 385/141–145; 65/385, 386; 430/269, 330
See application file for complete search history.

(56) References Cited

U.S. PATENT DOCUMENTS
5,851,736 A * 12/1998 Omote et al. ............ 430/325

(Continued)

FOREIGN PATENT DOCUMENTS
EP    1 205 804 A2    5/2002

(Continued)

OTHER PUBLICATIONS

Patent Abstracts of Japan (2003), Nitto Denko Corp., vol. 2003, No. 4.
European Search Report dated Jun. 1, 2004.

* cited by examiner

Primary Examiner—Brian Healy
Assistant Examiner—Charlie Peng
(74) Attorney, Agent, or Firm—Sughrue Mion, PLLC

(57) ABSTRACT

This invention provides a process for producing a three-dimensional polyimide optical waveguide, which comprises: (I) irradiating a polyamic acid film with a laser beam while converging the laser beam at an inside portion of the film and relatively moving the light convergence point, the polyamic acid film containing: (a) a polyamic acid obtained from a tetracarboxylic dianhydride and a diamine; and (b) per 100 parts of the polyamic acid, from 0.5 part by weight to less than 10 parts by weight of a specific 1,4-dihydropyridine derivative represented by formula (I):

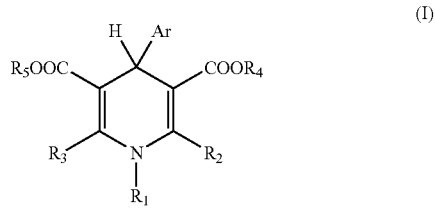

and then, (II) heating the polyamic acid film to imidize the polyamic acid, thereby obtaining an optical waveguide having a continuous core region where the refraction index has been changed, in the thus formed polyimide film.

11 Claims, 1 Drawing Sheet

U.S. PATENT DOCUMENTS

| | | | |
|---|---|---|---|
| 5,858,518 A * | 1/1999 | Omote et al. | 428/209 |
| 6,081,632 A | 6/2000 | Yoshimura et al. | |
| 6,096,482 A * | 8/2000 | Omote et al. | 430/311 |
| 6,100,582 A * | 8/2000 | Omote et al. | 257/699 |
| 6,132,930 A * | 10/2000 | Hayashi et al. | 430/270.1 |
| 6,177,225 B1 * | 1/2001 | Weber et al. | 430/190 |
| 6,855,478 B1 * | 2/2005 | DeVoe et al. | 430/270.1 |
| 2001/0021293 A1 * | 9/2001 | Kouta et al. | 385/37 |

FOREIGN PATENT DOCUMENTS

| | | | |
|---|---|---|---|
| JP | 6-337320 A | 12/1994 | |
| JP | 2002-14246 A | 1/2002 | |
| WO | WO-92/00185 * | 1/1992 | 264/1.1 |
| WO | WO 92/00185 A1 | 1/1992 | |
| WO | WO 01/96915 A2 | 12/2001 | |

US 7,085,469 B2

PROCESS FOR PRODUCING THREE-DIMENSIONAL POLYIMIDE OPTICAL WAVEGUIDE

FIELD OF THE INVENTION

The present invention relates to a process for producing a three-dimensional polyimide optical waveguide. More particularly, the invention relates to a process for easily producing a three-dimensional polyimide optical waveguide, without employing a dry process, by irradiating an inside portion of a polyamic acid film having incorporated therein a photosensitive agent with a low power laser beam while relatively moving a light convergence point.

BACKGROUND OF THE INVENTION

With the progress of practical application of optical communication systems by the development of optical fibers, the development of various optical communication devices using an optical waveguide structure has been demanded. In general, characteristics required for optical waveguide materials include low light propagation loss, possession of heat resistance and humidity resistance, and controllability of the refraction index and film thickness. With respect to these requirements, silica-based optical waveguides have hitherto been chiefly investigated.

However, in construction of optical fiber networks inclusive of WDM communication, it is essential to reduce costs for fabricating various devices. Accordingly, in order to apply polymer materials that can be mass-produced and subjected to large-area processing to optical waveguide materials, organic materials inclusive of polymethyl methacrylates, polycarbonates and polystyrenes have been investigated in recent years. However, in the case where such polymers are subjected to hybrid integration with a laser diode, a photo diode, etc., they have the defect that the range of their use is very limited, because their heat resistance in a solder reflow step is not sufficient. Of a number of polymer materials, polyimide resin-based materials have the highest heat resistance, so that they have recently attracted a great deal of attention as optical waveguide materials.

Optical circuits made of a polyamide resin have hitherto been generally formed by the following dry process. That is, a polyamic acid as a polyimide resin precursor is first dissolved in a polar solvent such as N,N-dimethylacetamide or N-methyl-2-pyrrolidone to prepare a polyamic acid varnish, which is applied onto a substrate by spin coating or casting and heated to remove the solvent and undergo ring closure of the polyamic acid for imidation, thereby forming a polyimide resin film, and then, a pattern is formed by reactive ion etching (RIE) using oxygen plasma etc.

However, according to the conventional dry process in which the polyimide resin film is subjected to reactive ion etching to form a pattern as described above, not only it takes a long period of time to form an optical circuit, but also the problem of reducing costs is not solved yet because a processing region is restricted. Further, according to such a dry process, a wall surface (side surface) of the pattern formed is not flat, so that scattering loss becomes large during wave guiding of light into the optical circuit.

Characteristics other than the loss required for the optical waveguide include good connection to optical functional parts and the capability of miniaturization. In the field of optical use such as optical communication, optical measurement or optical recording, a number of optical functional parts have been used for the purposes of switching, branching and connection of optical paths, and polarization, amplification, interference and diffraction of light waves, etc. As for these optical functional parts, respective parts to which functions are independently given are previously prepared, and then, these optical functional parts are combined to construct a desired system. Also in such a field of optical use, it is predicted similarly to the field of electronic use that developments will proceed toward high-density optical devices, highly integrated systems by three-dimensional lamination, miniaturized systems, etc. Accordingly, the development of techniques for unitizing or modularizing the optical functional parts has been demanded.

The optical functional parts are generally precision parts comprising materials such as inorganic glasses, metal oxides or plastic materials, so that it has been desired that actions by heat, pressure, reactive gas, etc. given in a unitizing step and a modularizing step are limited in terms of time and space in the greatest extent possible. Processing methods utilizing light are essentially suitable means for processing on any sites, and there is the possibility that optical processing can be easily conducted by utilizing polymer materials (plastic materials).

Specifically, the polymer materials have the feature that their thermal conductivity is low, so that it is liable to easily store heat. That is, in the polymer materials, the thermal motion thereof easily occurs compared to the inorganic glass materials, and only a small amount of heat is necessary for movement or reaction. There is therefore the possibility that an induced structure is formed even at relatively low irradiation energy, compared to the inorganic glass materials. Accordingly, the formation of the induced structure of the polymer materials using an ultra short pulse laser particularly has the advantage that it can be formed at any sites and in situ by irradiation of a lower-energy laser beam, compared to the inorganic glass materials.

On the other hand, with respect to miniaturization, so-called three-dimensional optical waveguides in which the optical waveguides are three-dimensionally fabricated have been known. As methods for producing the three-dimensional optical waveguides comprising polymer materials, a method using a gray mask or a shadow mask and a method according to a laser beam have hitherto been known (see, for example, Patent Document 1).

However, in the above-mentioned method using the gray mask or the shadow mask, not only it is necessary to form a clad material and a core material separately, but also RIE processing must be used. It has therefore the problem of low productivity. Further, the above-mentioned method according to the laser beam has the advantage that the process itself is simple and a core having a circular cross section can be formed. However, in order to modify the polymer itself, there is the restriction that an extremely high power laser must be used.

Patent Document 1: JP 2002-14246 A

SUMMARY OF THE INVENTION

In order to solve the above-mentioned problems in the formation of the conventional polyimide optical waveguides, particularly the formation of the three-dimensional polyimide optical waveguides, the present inventors have made extensive investigations. As a result, it was discovered that by irradiating an inside portion of a polyamic acid film having incorporated therein a photosensitive agent, with such a low power laser beam that is unreactive to the polyamic acid, but reactive only to the photosensitive agent, while relatively moving a light convergence point thereof, followed by imidation of the polyamic acid, an effective difference in the refraction index can be obtained between the irradiated area and the non-irradiated area, thus being able to easily form the three-dimensional polyimide optical waveguide. Thus, the invention has been accomplished.

Accordingly, an object of the invention is to provide a method for easily producing a three-dimensional polyimide optical waveguide without using a dry process but by irradiation of a low power laser beam while converging the laser beam at an inside portion of a polyamic acid film having incorporated therein a photosensitive agent.

Other objects and effects of the invention will become apparent from the following description.

According to the invention, there is provided a process for producing a three-dimensional polyimide optical waveguide, which comprises:

(I) irradiating a polyamic acid film with a laser beam while converging the laser beam at an inside portion of the film and relatively moving the light convergence point, the polyamic acid film containing:
  (a) a polyamic acid obtained from a tetracarboxylic dianhydride and a diamine; and
  (b) per 100 parts of the polyamic acid, from 0.5 part by weight to less than 10 parts by weight of a 1,4-dihydropyridine derivative represented by formula (I):

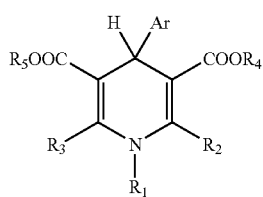

wherein Ar represents an aromatic group having a nitro group at an ortho-position with respect to the bonding position to the 1,4-dihydropyridine ring; $R_1$ represents a hydrogen atom or an alkyl group having 1 to 3 carbon atoms; and $R_2$, $R_3$, $R_4$ and $R_5$ each independently represents a hydrogen atom or an alkyl group having 1 or 2 carbon atoms, and then, (II) heating the polyamic acid film to imidize the polyamic acid, thereby obtaining an optical waveguide having a continuous core region where the refraction index has been changed, in the thus formed polyimide film.

Figure 1:
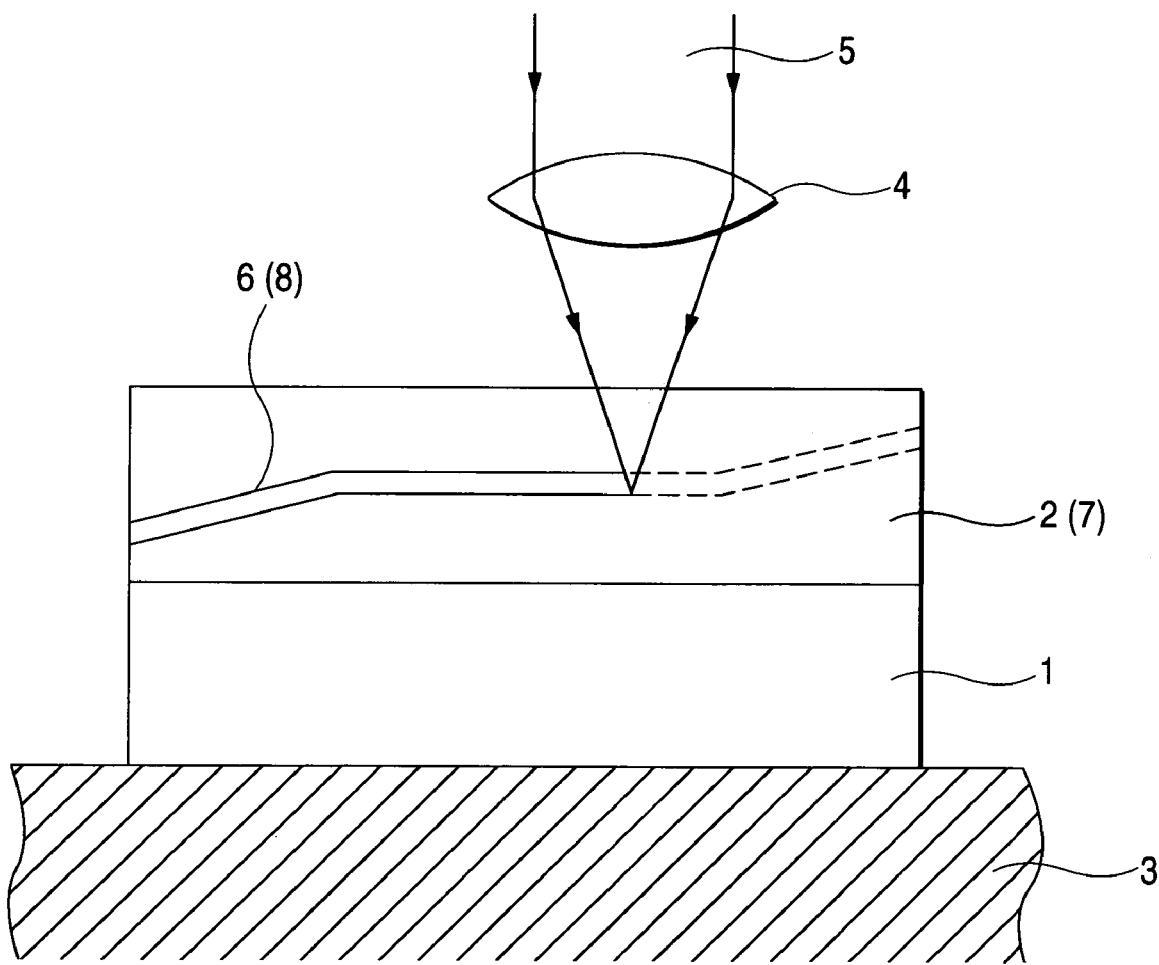
FIG. 1 is a schematic view illustrating an example of the process for producing a three-dimensional polyimide optical waveguide according to the invention.

The reference numerals used in the drawing represent the followings, respectively.

1: Substrate
2: Photosensitive polyamic acid film
3: Precision stage
4: Lens
5: Laser beam
6: Core precursor
7: Polyimide film
8: Core

DETAILED DESCRIPTION OF THE INVENTION

In the invention, the photosensitive polyamic acid comprises:
(i) a polyamic acid obtained from a tetracarboxylic dianhydride and a diamine, and
(ii) a photosensitive agent comprising a 1,4-dihydropyridine derivative represented by formula (I):

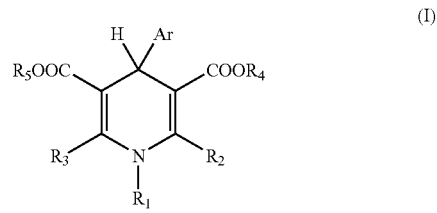

wherein Ar represents an aromatic group having a nitro group at an ortho-position with respect to the bonding position to the 1,4-dihydropyridine ring; $R_1$ represents a hydrogen atom or an alkyl group having 1 to 3 carbon atoms; and $R_2$, $R_3$, $R_4$ and $R_5$ each independently represents a hydrogen atom or an alkyl group having 1 or 2 carbon atoms.

In the invention, the tetracarboxylic dianhydride is not particularly limited, and examples thereof include pyromellitic anhydride, 3,3',4,4'-biphenyltetracarboxylic dianhydride, 2,2-bis(2,3-dicarboxyphenyl)propane dianhydride, 2,2-bis(3,4-dicarboxyphenyl)propane dianhydride, 3,3',4,4'-benzophenonetetracarboxylic dianhydride, bis-(3,4-dicarboxyphenyl)ether dianhydride and bis(3,4-dicarboxyphenyl)sulfonic dianhydride.

However, according to the invention, it is particularly preferred that the tetracarboxylic dianhydride is one containing a fluorine atom in its molecule (hereinafter referred to as a "fluorine-substituted tetracarboxylic dianhydride"). Such tetracarboxylic dianhydrides include, for example, 2,2-bis(3,4-dicarboxyphenyl)hexafluoropropane dianhydride, 4,4-bis(3,4-dicarboxytrifluorophenoxy)tetrafluorobenzene dianhydride, 1,4-bis(3,4-dicarboxytrifluorophenoxy)tetrafluorobenzene dianhydride, (trifluoromethyl)pyromellitic dianhydride, di(trifluoromethyl)pyromellitic dianhydride and di(heptafluoropropyl)pyromellitic dianhydride.

On the other hand, the diamines include, for example, m-phenylenediamine, p-phenylenediamine, 3,4'-diaminodiphenyl ether, 4,4'-diaminodiphenyl ether, 4,4'-diaminodiphenylsulfone, 3,3'-diaminodiphenylsulfone, 2,2-bis(4-aminophenoxyphenyl)propane, 1,3-bis(4-aminophenoxy)benzene, 1,4-bis(4-aminophenoxy)benzene, 2,4-diaminotoluene, 2,6-diaminotoluene, 4,4'-diaminodiphenylmethane and 4,4'-diamino-2,2'-dimethylbiphenyl.

Similarly to the tetracarboxylic dianhydride, according to the invention, it is particularly preferred that the diamine is one containing a fluorine atom in its molecule (hereinafter referred to as a fluorine-substituted diamine). Such diamines include, for example, 2,2'-bis(trifluoromethoxy)-4,4'-diaminobiphenyl (TFMOB), 3,3'-diamino-5,5'-bis(trifluoromethyl)biphenyl, 2,2-bis(4-aminophenyl)hexafluoropropane (BAAF), 2,2-bis[4-(4-aminophenoxy)phenyl]hexafluoropropane (HFBAPP), 2,2'-bis(trifluoromethyl)-4,4'-diaminobiphenyl (TFMB), 2,2-bis(3-amino-4-hydroxyphenyl)hexafluoropropane (BIS-AP-AF), 2,2-bis(3-amino-4- methylphenyl)hexafluoroprpoane (BIS-AT-AF), 2,2'-difluorobenzidine (FBZ), 4,4'-bis(aminooctafluoro) biphenyl, 3,5-diaminobenzotrifluoride and 1,3-diamino-2,4,5,6-tetrafluorobenzene.

According to the invention, the polyamic acid can be obtained by reacting a tetracarboxylic dianhydride as described above with a diamine as described above in accordance with a conventional method. That is, for example, to a solution in which a diamine is dissolved in an appropriate organic solvent, a tetracarboxylic dianhydride is added in the amount equimolar to the diamine in an atmosphere of nitrogen, and the resulting mixture is stirred at room temperature for about 5 to about 20 hours, whereby the polyamic acid can be obtained as a viscous solution.

The solvent is not particularly limited as long as it has hitherto been used for the production of polyamic acids. For example, polar solvents such as N,N-dimethylacetamide (DMAc) and N-methyl-2-pyrrolidone (NMP) are preferably used, and DMAc is particularly preferably used because it does not thermally decompose and has excellent transparency.

The photosensitive polyamic acid for use in the invention contains as the photosensitive agent the 1,4-dihydropyridine derivative represented by the above-mentioned general formula (I) in an amount of from 0.5 part by weight to less than 10 parts by weight per 100 parts by weight of the polyamic acid.

Specific examples of the photosensitive agents include 1-ethyl-3,5-dimethoxycarbonyl-4-(2-nitrophenyl)-1,4-dihydropyridine, 1-methyl-3,5-dimethoxycarbonyl-4-(2-nitrophenyl)-1,4-dihydropyridine, 1-propyl-3,5-dimethoxycarbonyl-4-(2-nitrophenyl)-1,4-dihydropyridine and 1-propyl-3,5-diethoxycarbonyl-4-(2-nitrophenyl)-1,4-dihydropyridine.

According to the invention, of the various photosensitive agents described above, 1-ethyl-3,5-dimethoxycarbonyl-4-(2-nitrophenyl)-1,4-dihydropyridine (hereinafter referred to as "EDHP") is particularly preferably used from the viewpoints of low cost and low light absorption by the C—H bond.

Such a 1,4-dihydropyridine derivative can be obtained, for example, by reacting a substituted benzaldehyde, an alkyl propionate (an alkyl ester of propargylic acid) in a molar amount of two times the amount of the substituted benzaldehyde, and a corresponding primary amine in glacial acetic acid under reflux (Khim. Geterotsikl. Soed., pp. 1067–1071, 1982).

According to the invention, the photosensitive agent is used within the range of 0.5 part by weight to less than 10 parts by weight per 100 parts by weight of the polyamic acid. When the photosensitive polyamic acid is prepared by using the photosensitive agent in an amount of 10 parts by weight or more per 100 parts by weight of the polyamic acid, the resulting polyimide resin is caused to absorb light in a near infrared region. On the other hand, when the blending ratio of the photosensitive agent is less than 0.5 part by weight per 100 parts by weight of the polyamic acid, such a difference in the refraction index that enables the formation of the optical waveguide structure between the laser-irradiated area and the non-irradiated area cannot be given even when the resulting photosensitive polyamic acid is irradiated with a laser beam for imidation.

The process for producing the three-dimensional polyimide optical waveguide according to the invention using the photosensitive polyamic acid as described above will be described below.

As shown in FIG. 1, first, a photosensitive polyamic acid film 2 formed on an appropriate substrate 1 is placed on a precision stage 3, and the inside of the polyamic acid film is irradiated with a laser beam 5 through a lens 4, while converging the laser beam at a predetermined site and relatively moving the light convergence point, thereby causing a difference in the refraction index with making the refraction index of the irradiated site greater than that of the non-irradiated site.

The substrate 1 is not particularly limited, and any material such as a glass substrate, a silicon wafer, a metal film, a plastic film, a glass-epoxy substrate, a printed wiring board or a flexible circuit substrate can be used, as long as the photosensitive polyamic acid can be coated thereon. However, in the case where a film made of the photosensitive polyamic acid can be prepared in advance, the substrate is not necessarily required.

The method for applying the photosensitive polyamic acid onto the surface of the substrate is not particularly limited and, for example, a general film formation method such as spin coating or casting can be used. After coating, initial drying is conducted at a temperature of about 60 to about 120° C. to form the photosensitive polyamic acid film. Although the thickness of the polyamic acid is not particularly limited, it is preferred that it is usually within the range of 3 to 2,000 μm in order to form the three-dimensional optical waveguide in the inside thereof.

The laser used for processing the photosensitive polyamic acid film is not particularly limited, as long as it is a laser which is unreactive to the polyamic acid, but to which the photosensitive agent contained in the photosensitive polyamic acid film is sensitive. For example, a pulse laser having a pulse width of $10^{-15}$ to $10^{-12}$ second can be used. Among them, a pulse laser having a pulse width of the order of $10^{-15}$ second is preferred, and more specifically, a pulse laser having a pulse width of $10 \times 10^{-15}$ to $500 \times 10^{-15}$ second, preferably about $50 \times 10^{-15}$ to about $300 \times 10^{-15}$ second, is suitable. The pulse laser having a pulse width of $10^{-15}$ to $10^{-12}$ second can be obtained, for example, by reproducing and amplifying a laser using a titanium-sapphire crystal as a medium, or a dye laser.

In the pulse laser, the repeating frequency thereof is, for example, within the range of 1 Hz to 80 MHz, and preferably within the range of 10 Hz to 500 kHz.

In the invention, the average output or irradiation energy of the pulse laser is not particularly limited, and it can be appropriately selected depending on the intended size of the core, the required difference in the refraction index between the irradiated area (core) and the non-irradiated area (clad), etc. Usually, it is within the range of 1 to 500 mW, preferably within the range of 5 to 300 mW, and most preferably within the range of 10 to 100 mW. As described above, according to the invention, the irradiation energy of a pulse laser beam may be low.

In particular, according to the invention, two-photon absorption by a titanium-sapphire-femtosecond pulse laser having an irradiation wavelength of about 800 nm can be preferably utilized. That is, the use of two-photon absorption by the titanium-sapphire-femtosecond pulse laser can efficiently generate wavelength energy near about 400 nm in the vicinity of a focus of the laser beam, and thus, can allow only the photosensitive agent in the vicinity of the focus of the laser beam to react. On the other hand, the photosensitive agent other than that in the vicinity of the focus is not affected. Thus, a thermal effect on the polyamic acid itself by the irradiation of the pulse laser beam can be inhibited or prevented and hence the use of the two-photon absorption is preferred.

Further, according to the invention, the irradiation spot diameter of the pulse laser is not particularly limited, and can be appropriately selected depending on the intended size of the core, the required difference in the refraction index between the core and the non-irradiated area (clad), the size, numerical aperture or magnification of a lens, etc. For example, it can be selected from the range of about 0.1 to about 10 μm.

According to the invention, the size and shape of the core and the degree of the change in the refraction index can be appropriately adjusted by the irradiation time of the laser beam, the moving direction of the focusing position of the laser beam and the speed thereof, the kind of the plastic material, the size of the pulse width and the magnitude of irradiation energy of the laser beam, the numerical aperture or magnification of the lens for adjusting the focus of the laser beam, etc.

As described above, according to the invention, the light convergence point is relatively moved, while converging the pulse laser beam at a predetermined site of the polyamic acid film and irradiating the site therewith by the use of the lens, thereby being capable of forming, in the polyamic acid film, a continuous region (i.e., a core precursor 6) having a predetermined three-dimensional shape and having a refraction index changed greater than the non-irradiated site.

The position of the light convergence point (focal point) of the laser can be moved by moving the relative position of the polyamic acid film to the laser and the lens, for example, by moving the laser and the lens, and/or the polyamic acid film. Specifically, for example, such a change in the refraction index that gives a core having an intended shape can be continuously generated on any site in the polyamic acid film by placing the subject to be exposed having the polyamic acid film on the stage which can be precisely moved in a two-dimensional or three-dimensional direction, fixing a pulse laser generator and lens so as to be focused in the polyamic acid film, and moving the stage to move the focal point.

In the invention, the shape of the core precursor including the diameter, width and longitudinal shape thereof, and the cross sectional shape thereof are not particularly limited. However, for example, the diameter or width of the core precursor is suitably ranges from about 0.1 to about 1,000 μm, preferably from about 0.1 to about 100 μm, and more preferably from about 0.5 to about 30 μm. On the other hand, the longitudinal shape of the core precursor may be either a linear shape or a crooked or inflected shape. Further, it may be a combined shape of a linear shape and a crooked or inflected shape. The longitudinal length of the core precursor is also not particularly limited. Further, the cross sectional shape of the core precursor may be, for example, substantially circular or substantially polygonal (for example, substantially quadrilateral).

According to the invention, the size and shape of the core precursor need not be the same over the whole core precursor, as long as the core precursor is continuously formed. Further, in one three-dimensional waveguide structure, the number of the core precursor is not particularly limited, and it may be either singular or plural. In a structure having a plurality of core precursors in its inside, it is also possible to be a laminated structure in which the core precursors are laminated at a suitable interval(s). When the plurality of core precursors are provided in the inside of one structure, the interval thereof can be arbitrarily selected. The interval of the core precursors is preferably 5 μm or more. When the distance of the core precursors 6 provided in the inside of the structure is less than 5 μm, the core precursors may be fused together with each other in the fabrication of the optical waveguides, failing to form a plurality of independent waveguides.

As described above, in the invention, the irradiated site which is more increased in the refraction index than the non-irradiated site can be formed as a continuous region by the simple operation of relatively moving the focus position while irradiating an inside portion of the photosensitive polyamic acid film with the pulse laser beam by narrowing the focus thereof. Thus, the continuous three-dimensional core precursor can be easily formed on any site of the polyamic acid film.

Even when the polyamic acid film is irradiated with the laser beam while converging it in the polyamic acid film to form the core precursor as described above, neither chemical nor physical changes occur in the non-irradiated area of the polyamic acid film, and the refraction index thereof is lower than that of the area irradiated with the pulse laser beam. Accordingly, after imidation of the polyamic acid, the non-irradiated area functions as the clad of the optical waveguide.

As described above, after the core precursor is formed in the polyamic acid film, the polyamic acid is heated for imidation, whereby a polyimide optical waveguide having a three-dimensional core 8 in a polyimide resin film 7 as shown in FIG. 1 can be obtained. With regard to the heating of the polyamic acid for imidation, it may usually be heated at a temperature ranging from 300 to 400° C. under vacuum or in an atmosphere of nitrogen.

The three-dimensional polyimide optical waveguide according the invention can be joined, for example, to optical switching parts, optical branching and combining parts, wavelength converting filters, isolators, optical circulators, optical connecters, optical external modulators, etc to use.

According to the invention, while converging the laser beam at an inside portion of the photosensitive polyamic acid film having incorporated therein the polyamic acid and the photosensitive agent, the focal point thereof is relatively moved, thereby being capable of easily forming a three-dimensional polyimide optical waveguide even by low power laser irradiation.

EXAMPLES

The invention will be illustrated in greater detail with reference to the following Examples, but it should not be construed that the invention is limited by these examples.

Example 1

In a 500-ml separable flask, 16.0 g (0.05 mole) of 2,2'-bis(trifluoromethyl)-4,4'-diaminobiphenyl (TFMB) was dissolved in 152.8 g of N,N-dimethylacetamide (DMAc) in an atmosphere of nitrogen to prepare a solution. To this solution, 22.2 g (0.05 mole) of 2,2-bis(3,4-dicarboxyphenyl) hexafluoropropane dianhydride (6FDA) was added with stirring, followed by stirring at room temperature for 24 hours to obtain a polyamic acid solution. Further, 1.53 g (4.0 parts by weight per 100 parts by weight of polyamic acid solid content) of a photosensitive agent (EDHP) was added to this polyamic acid solution to prepare a photosensitive polyamic acid solution (hereinafter referred to as a "photosensitive polyamic acid varnish").

The photosensitive polyamic acid varnish was applied onto a synthetic silica glass substrate having a thickness of 1.0 mm by spin coating, and dried at 90° C. for about 15 minutes to obtain on the substrate a subject to be exposed having a polyamic acid film of 30 μm in terms of thickness after drying.

This subject to be exposed was placed on a stage, and while irradiating an ultra short pulse laser beam (irradiation wavelength: 800 nm, pulse width: $150 \times 10^{-15}$ second, repetition frequency: 200 kHz) under conditions of an irradiation energy (average output) of 30 mW and an irradiation spot diameter of about 10 μm, using a titanium-sapphire-femtosecond pulse laser and an objective lens (10 magnification), and focusing on a position at a depth of about 10 μm from the surface of the photosensitive polyamic acid film, as shown in FIG. 1., the subject to be exposed was linearly relatively moved in a direction perpendicular to an irradiation direction of the laser beam at a moving speed of about 500 μm/second for 20 second.

Then, the polyamic acid film irradiated with the laser beam was heated at 360° C. for 2 hours in a vacuum atmosphere to complete imidation (curing), thereby obtaining an optical waveguide having a length of 10 mm in the polyimide film. Sites 1 mm apart from both ends of this optical waveguide were cut with a dicing device and subjected to edge processing. Then, a light having a wavelength of 1550 nm was allowed to be incident on the optical waveguide core through a single mode fiber, and it was confirmed that the light was propagated through the core.

Example 2

The photosensitive polyamic acid varnish prepared in Example 1 was applied onto a synthetic silica glass substrate having a thickness of 1.0 mm by spin coating, and dried at 90° C. for about 15 minutes to obtain on the substrate a subject to be exposed having a polyamic acid film of 50 μm in terms of thickness after drying.

This subject to be exposed was placed on a stage, and while irradiating an ultra short pulse laser beam (irradiation wavelength: 800 nm, pulse width: $150 \times 10^{-15}$ second, repetition frequency: 200 kHz) under conditions of an irradiation energy (average output) of 30 mW and an irradiation spot diameter of about 10 μm, using a titanium-sapphire-femtosecond pulse laser and an objective lens (10 magnification), and focusing on a bottom face at a depth of about 40 μm from the surface of the photosensitive polyamic acid film, as shown in FIG. 1, relative movement operation was carried out so as to move the focal point to rise in a thickness direction at an inclination of about 10 degrees from the plane parallel to the surface of the substrate at a relative moving speed of about 500 μm/second for 5 seconds, then move in a direction parallel to the surface of the substrate at a relative moving speed of about 500 μm/second for 10 seconds, and further move to rise in a thickness direction at an inclination of about 10 degrees from the plane parallel to the surface of the substrate at a relative moving speed of about 500 μm/second for 5 seconds.

Then, the polyamic acid film irradiated with the laser beam was heated at 360° C. for 2 hours in a vacuum atmosphere to complete imidation (curing), thereby obtaining an optical waveguide having a crooked three-dimensional structure in the polyimide film. In the same manner as in Example 1, edge processing was carried out and then a light having a wavelength of 1550 nm was allowed to be incident on the optical waveguide core through a single mode fiber, thereby confirming that the light was propagated through the core.

Comparative Example 1

It was attempted to prepare an optical waveguide in the same manner as in Example 1, except that a polyamic acid varnish prepared by omitting the addition of the photosensitive agent (EDHP) was used. In this case, however, even after the polyamic acid film was irradiated with the laser beam, and even after the imidation of the polyamic acid was completed, no changes in the refraction index occurred in the laser-irradiated site, resulting in failure to form the core (precursor).

While the invention has been described in detail and with reference to specific embodiments thereof, it will be apparent to one skilled in the art that various changes and modifications can be made therein without departing from the spirit and scope thereof.

This application is based on Japanese Patent Application No. 2002-341565 filed Nov. 25, 2002, the contents thereof being herein incorporated by reference.

What is claimed is:

1. A process for producing a three-dimensional polyimide optical waveguide, which comprises:
   (I) irradiating a polyamic acid film with a laser beam while converging the laser beam at an inside portion of the film and relatively moving the light convergence point, the polyamic acid film containing:
   (a) a polyamic acid obtained from a tetracarboxylic dianhydride and a diamine; and
   (b) per 100 parts of the polyamic acid, from 0.5 part by weight to less than 10 parts by weight of a 1,4-dihydropyridine derivative represented by formula (I):

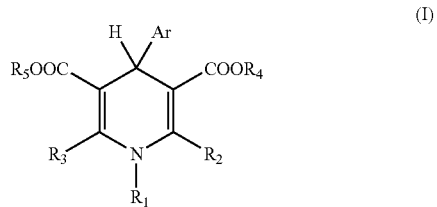

wherein Ar represents an aromatic group having a nitro group at an ortho-position with respect to the bonding position to the 1,4-dihydropyridine ring; $R_1$ represents a hydrogen atom or an alkyl group having 1 to 3 carbon atoms; and $R_2$, $R_3$, $R_4$ and $R_5$ each independently represents a hydrogen atom or an alkyl group having 1 or 2 carbon atoms, and then,
   (II) heating the polyamic acid film to imidize the polyamic acid, thereby obtaining an optical waveguide having a continuous core region where the refraction index has been changed, in the thus formed polyimide film,
   wherein the laser beam is a pulse laser having a pulse width of $10^{-15}$ to $10^{-12}$ second and the pulse laser has a repeating frequency of from 10 Hz to 500 kHz.

2. The process according to claim 1, wherein the tetracarboxylic dianhydride contains a fluorine atom.

3. The process according to claim 1, wherein the diamine contains a fluorine atom.

4. The process according to claim 1, wherein the 1,4-dihydropyridine derivative represented by formula (I) is selected from the group consisting of 1-ethyl-3,5-dimethoxycarbonyl-4-(2-nitrophenyl)-1,4-dihydropyridine, 1-methyl-3,5-dimethoxycarbonyl-4-(2-nitrophenyl)-1,4-dihydropyridine, 1-propyl-3,5-dimethoxycarbonyl-4-(2-nitrophenyl)-1,4-dihydropyridine and 1-propyl-3,5-diethoxycarbonyl-4-(2-nitrophenyl)-1,4-dihydropyridine.

5. The process according to claim 4, wherein the 1,4-dihydropyridine derivative represented by formula (I) comprises 1-ethyl-3,5-dimethoxycarbonyl-4-(2-nitrophenyl)-1,4-dihydropyridine.

6. The process according to claim 1, wherein the pulse width is $10 \times 10^{-15}$ to $500 \times 10^{-15}$ second.

7. The process according to claim 1, wherein the pulse width is about $50 \times 10^{-15}$ to about $300 \times 10^{-15}$ second.

8. The process according to claim 1, wherein the irradiation of the pulse laser is carried out at an irradiation energy of from 1 to 500 mW.

9. The process according to claim 8, wherein the irradiation energy of the pulse laser is from 10 to 100 mW.

10. The process according to claim 1, wherein an irradiated site of the polyamic acid film has a refraction index greater than that of a non-irradiated site of the polyamic film.

11. The process according to claim 1, wherein irradiation changes the refraction index of the polyamic acid film.

* * * * *